Figure 4:
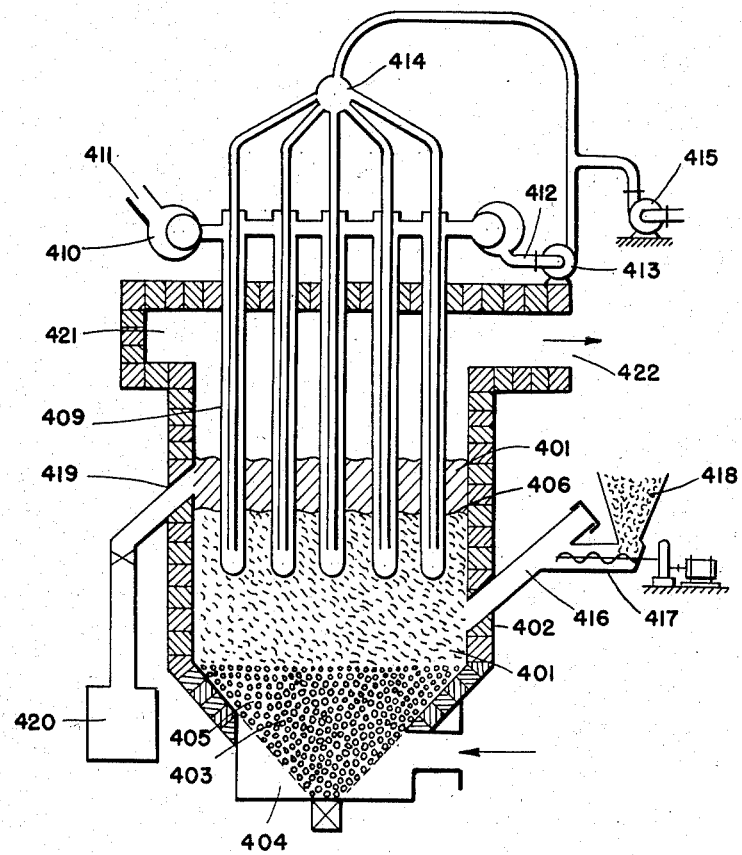

Jan. 11, 1955  A. JOHANNSEN ET AL  2,699,375
PRODUCTION OF GASES CONTAINING SULFUR DIOXIDE
Filed March 13, 1951  2 Sheets-Sheet 1
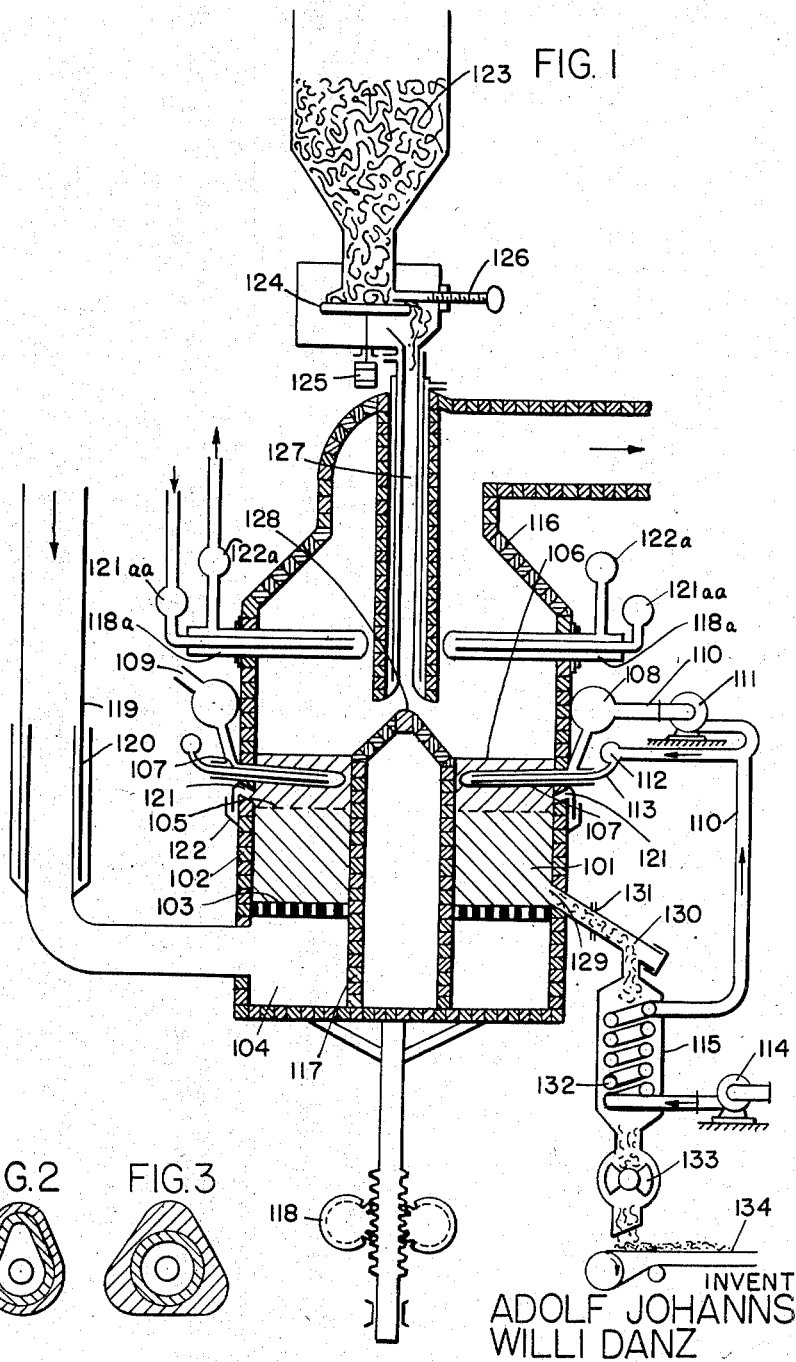
INVENTORS:
ADOLF JOHANNSEN
WILLI DANZ
KARL FEES
WALTER KAMMERER
BY Marshall, Johnston, Cook & Root
ATT'YS Jan. 11, 1955   A. JOHANNSEN ET AL   2,699,375
PRODUCTION OF GASES CONTAINING SULFUR DIOXIDE
Filed March 13, 1951   2 Sheets-Sheet 2

INVENTORS:
ADOLF JOHANNSEN
WILLI DANZ
KARL FEES
WALTER KAMMERER

# United States Patent Office 2,699,375
Patented Jan. 11, 1955

2,699,375

PRODUCTION OF GASES CONTAINING SULFUR DIOXIDE

Adolf Johannsen, Ludwigshafen (Rhine), Willi Danz, Ludwigshafen (Rhine-Oggersheim), and Karl Fees and Walter Kammerer, Ludwigshafen (Rhine), Germany, assignors to Badische Anilin- & Soda-Fabrik Aktiengesellschaft, Ludwigshafen am Rhine, Germany Application March 13, 1951, Serial No. 215,224

Claims priority, application Germany March 28, 1950

5 Claims. (Cl. 23—177)

This invention relates to improvements in the production of gases containing sulfur dioxide by roasting sulfur-containing ores.

In the roasting of comminuted pyrites for the production of gases containing sulfur dioxide in the known mechanical roasting furnaces there is the danger, especially with a high throughput through the furnace, that in the material to be roasted, which is moving in countercurrent to the air for roasting, low-melting eutectic mixtures of iron sulfides and gangue may form locally which lead to a softening of the material to be roasted and give rise to agglomerations so that considerable trouble may be encountered, for example by sticking of the stirring arms or by the formation of annular deposits in rotary tubular furnaces. Such softenings may also arise when the iron pyrite is roasted in a layer which is kept in up and down whirling movement by means of the oxygen-containing gases necessary for the roasting which are led upwards through the comminuted material with the co-action of the gases formed in the strongly exothermic roasting reaction, the said layer being kept constantly in the same state of reaction by continuous or periodic supply of pyrite and withdrawal of roasted ore.

According to the co-pending application Ser. No. 197,196 of Johannsen et al., filed November 24, 1950, the said troubles in the whirling layer are avoided even with high throughputs if the roasting speed in the layer is increased to such an extent, by maintaining a sufficiently high temperature, that the layer consists predominantly of substantially roasted particles and if at the same time the temperature in the layer is not allowed to exceed the softening point of the substantially roasted material. In the said application there are several means indicated for regulating the temperature. An efficient cooling may be effected by withdrawing the radiant heat originating from the surface of the layer and utilizing it; this is preferably done by using the heat for producing steam. In this way the danger of softening and slagging of the material to be roasted is avoided and a regulated continuous withdrawal of the roasted ore from the layer insured and moreover, as a result of the withdrawal of heat at the radiating surface of the layer, the heat convection movements within the layer are enhanced. The member which absorbs the radiant heat and which is preferably devised for the production or superheating of high tension steam, is advantageously arranged parallel to the radiating surface or inclined to the radiating surface at such an angle that no deposits of dust can form, i. e. substantially transversely to the direction of flow of the hot reaction gases.

From the whirling layer which, depending on the kind of pyrites to be processed, is advantageously at a temperature of from 850° to 1050° C., considerable amounts of heat may be withdrawn in the manner described above. If, however, it is desired to produce roaster gases having a high content of sulfur dioxide, in particular when employing air enriched with oxygen or when utilizing practically completely the oxygen of normal air with the recovery of roaster gases containing 15 to 16 percent of sulfur dioxide, the said kind of heat withdrawal is often insufficient to keep the temperature of the whirling layer below the upper limit which is determined by the softening point of the substantially roasted material.

We have now found that a considerable improvement in the withdrawal of heat may be effected by not only withdrawing the radiant heat of the whirling layer as shown and described in above application Serial No. 197,196 but also by directly withdrawing and using heat by convective means, in particular from the upper and middle layers of the whirling layer. In this case also, the heat is preferebaly used for the production of steam.

Since in the whirling bed an extremely good transference of heat takes place by radiation and convection (whirling layers which consist mainly of roasted ore of a grain size between 0.1 and 4 millimetres exhibit heat transfer figures of 300 and more kilogram calories per square metre per hour per ° C.), extremely small heat transfer surfaces are sufficient to withdraw the heat. The withdrawal of heat from the middle and upper layers of the whirling layer has the advantage that the cooling of the lower layers effected by the process itself (by the cold gases entering from below and by the cold introduced ore having a higher spec. weight than the roasted ore and which consequently becomes enriched in the lower layers) is enhanced in an efficient manner. Accumulations of heat which in spite of the whirling motion should occur in the upper end central layers when the throughput is high, are thereby avoided.

The members for the withdrawal of convective heat may be arranged horizontally, obliquely or vertically in the middle and upper layers of the whirling layer. It is especially advantageous to arrange the convective heat-absorbing members in that part of the roasting layer into which the latter is extended during the transition from the quiescent state to the whirling state under the influence of the gases flowing upwardly through the layer. By this arrangement, the excess heat (just as in the case when withdrawing only the radiant heat by heat-absorbing members situated above the whirling layer) is exclusively withdrawn from the uppermost layers of the whirling bed and thus the formation of additional heat convection currents is facilitated and these reinforce the whirling motion caused by the ascending gases. The arrangement also has the advantage that when the apparatus is not in operation there is no contact between the heat-absorbing members and the reaction material because the whirling layer falls to the level of its quiescent state. In this way the cooling action is automatically reduced and too strong a cooling of the material which in the quiescent state no longer evolves heat, is avoided. Furthermore any adherence of the quiescent reaction material to the heat-absorbing members is safely prevented.

Figure 1 shows an apparatus with heat-absorbing members in that part of the layer into which the latter extends by reason of the whirling motion. The layer 101 of material to be roasted is situated in a cylindrical container 102 lined with refractory ceramic material. The oxygen-containing gases pass through the grate 103 from the channel 104 into the layer 101. As a consequence of the whirling motion, the layer extends from the level 105 to the level 106. The heat-absorbing members 107, which are constructed as Field tubes and arranged at a slight inclination, are flushed by the roasting material which is whirling up and down and this results in an intense transfer of heat to the water flowing through the tubes with the formation of superheated steam. The steam and entrained water collect in the annular pipe 108 from which the steam is led through a pipe 109 to the place where it is to be used. The separated water is returned through the pipe 110 by the circulating pump 111 and the annular pipe 112 to the Field tubes, a uniform distribution to the individual tubes being insured by the throttles 113. The supply of fresh water is effected by means of a pump 114 to the pipe 110 through the device 115 which is intended for the cooling of the roasted ore (see below).

Additional heat-exchange members 118a are located above the layer for withdrawal of radiant heat, in a manner such as that shown and described in the aforementioned application Serial No. 197,196. The members 118a are constructed as steam superheating tubes, advantageously according to the Field system. In the radial direction they are uniformly distributed over the surface of the annular chamber and serve to absorb the radiant heat from the roasting layer and the heat reflected by the arched roof.

Steam produced, for example, from water employed to cool the roasted ore and the roaster gas, in a manner such as that disclosed in the aforesaid application, is introduced via the ring channel 121*aa* into the tubes 118*a* and is withdrawn from the annular channel 122*a* in the superheated condition. The reference characters employed to identify the foregoing parts corresponding to those illustrated in application Serial No. 197,196 are the same in each application with the addition of the letter "*a*" herein.

The heat-absorbing members 107 are introduced in a radial direction through the side walls of the upper part 116 of the device which are also provided with a refractory ceramic lining. While this part is rigidly arranged, the lower part (including the channel 104 and the centrally arranged hollow cylinder 117 consisting of refractory ceramic material) may be lowered with the aid of the mechanism 118. In the supply pipe 119 for the gases there is provided a liquid seal 120 which permits a lowering without interruption of the supply pipe. The junction 121 between the upper part and the lowerable lower part is sealed by cup closure which is preferably filled with roasted ore dust. In this way a sufficient seal is ensured, only a slight internal pressure of a few centimetres water column prevailing at this place.

The iron pyrites to be roasted falls from a reservoir 123, is measured by the supply device consisting of a rotary plate 124, driving motor 125 and stripping regulator 126, falls through the water-cooled down pipe 127, which is insulated from the surrounding hot gas chamber, onto the conical top 128 of the hollow cylinder 117 from which it is uniformly distributed over the upper surface of the whirling layer. Therein it goes down and is rapidly converted into roasted ore at temperatures of about 850° to 1050° C. The amount of roasted ore corresponding to the pyrites supplied is withdrawn through the opening 129 and the pipe 130. This pipe is lined with ceramic material and connected by a readily detachable flange 131 with the lowerable lower part of the device. The pipe guides the glowing roasted ore into the cooling device 115 in which it gives up the greater part of its sensible heat to the water flowing through the cooling coil 132. The roasted ore is withdrawn from the cooler by a sluice 133 and carried away on a conveyor band 134.

The Field tubes 107 are so inserted that each of them may be drawn out laterally after cutting the connecting pipes to the annular pipes 113 and 108 and replaced by a new tube. After lowering the lower part of the device, all the tubes are accessible for inspection. In order to avoid as far as possible an erosion of the steam tubes which, for example, are under pressures of 10 to 50 atmospheres, they are coated with a layer of heat-conducting, erosion-stable material. They are preferably also given a shape which substantially limits erosion attack to the less intense impact erosion, the sliding erosion, however, especially below the critical angle of incidence of about 20°, being avoided as far as possible. For example the tube may be given a cross-section corresponding to the longitudinal section of a falling drop (Figure 2) and the tube may be coated with a covering layer (shown cross-hatched) of erosion-proof and heat-stable cast iron. The water supply pipes are led in through the lower widened part. In the modification shown in Figure 3, the pressure-bearing tube (shown with horizontal hatching) has a normal cylindrical cross-section, but it is coated with a protective layer (shown with oblique hatching) of erosion-proof and heat-stable cast iron in such a way that the cross-section corresponds to an isosceles triangle with a horizontal base and rounded angles.

The heat-absorbing members may also be arranged vertically so that they project into the whirling layer for about down to two-thirds of its total height. An arrangement of this kind is shown in Figure 4. The layer 401 of material to be roasted is situated in a cylindrical container 402 lined with refractory material. The oxygen-containing gases enter from a channel 404 through the conical grate 403 into the layer 401 after they have flowed through a substrate of coarse-grained refractory material 405. By reason of the whirling motion, the layer is extended from the level 406 to the level 407. The heat-absorbing members 409, which are constructed as Field tubes and which project vertically through the closure cover, are flushed by the whirling roasting material and this results in an intense transfer of heat to the water flowing through the tubes with the formation of super-heated steam. The steam and the entrained water collect in the annular pipe 410 from which the steam is led through the pipe 411 to the place where it is to be used. The separated water is returned through the pipe 412, the circulating pump 413 and the distributing chamber 414 to the Field tubes 409. Fresh water is supplied to the heat-absorbing members by means of a pump 415 at a rate corresponding to the rate of steam production.

The pyrites to be roasted is supplied through the pipe 416 by means of a conveyor worm 417 from a bunker 418. The roasted material, in so far as it is not entrained as flue dust with the roaster gases, is transferred through an opening 419 to a collecting chamber 420. Cooling coils for the utilization of the sensible heat of the roasted material may be arranged in the down pipe in the same way as in Figure 2. The roaster gases collect in an annular channel 421 and leave through a tube 422. They are supplied, preferably after removal of dust, to a waste heat boiler for the utilization of their sensible heat.

The Field tubes 409 are coated with erosion-stable material; this material is especially thick on the lower closure surfaces of the tubes.

The process and apparatus may be modified in various ways within the scope of our invention. Instead of Field tubes there may also be used, for example, simple hairpin-curved tubes or spirally wound condenser coils.

What we claim is:

1. In the process for the production of gases containing sulfur dioxide by roasting sulfide-containing iron ore in a layer of roasted material which is maintained in a fluidized bed by means of the oxygen-containing gas necessary for the roasting and by means of the roaster gases formed therefrom in the strongly exothermic reaction, the steps which comprise roasting the layer at a temperature sufficiently high to cause rapid roasting in the layer to such an extent that the layer consists predominantly of substantially roasted particles, and maintaining the temperature in the layer below the softening point of the substantially roasted material by withdrawing radiant and convective heat from the layer by heat-exchange members located in part above the layer for withdrawal of radiant heat and in part in the layer for withdrawal of convective heat and only in the upper two-thirds of the layer.

2. In the process for the production of gases containing sulfur dioxide by roasting sulfide-containing iron ore in a layer of roasted material which is maintained in a fluidized bed by means of the oxygen-containing gas necessary for the roasting and by means of the roaster gases formed therefrom in the strongly exothermic reaction, the steps which comprise roasting the layer at a temperature sufficiently high to cause rapid roasting in the layer to such an extent that the layer consists predominantly of substantially roasted particles, and maintaining the temperature in the layer below the softening point of the substantially roasted material by withdrawing radiant and convective heat from the layer by heat-exchange members located in part above the layer for withdrawal of radiant heat and in part in the layer for withdrawal of convective heat and only in the zone of the layer in the upper two-thirds thereof formed by the transition from the quiescent state to the fluidized state and the concomitant increase in volume.

3. In the process for the production of gases containing sulfur dioxide by roasting sulfide-containing iron ore in a layer of roasted material which is maintained in a fluidized bed by means of the oxygen-containing gas necessary for the roasting and by means of the roaster gases formed therefrom in the strongly exothermic reaction, the steps which comprise roasting the layer at a temperature sufficiently high to cause rapid roasting in the layer to such an extent that the layer consists predominantly of substantially roasted particles, and maintaining the temperature in the layer below the softening point of the substantially roasted material by withdrawing radiant and convective heat from the layer by heat-exchange members each located in part above the layer for withdrawal of radiant heat and in part in the layer for withdrawal of convective heat and only in the upper two-thirds of the layer, each said part which is in the layer being a substantially vertically downward projection of the part about the layer.

4. In the process for the production of gases containing sulfur dioxide by roasting sulfide-containing iron ore in a layer of roasted material which is maintained in a fluidized bed by means of the oxygen-containing gas necessary for the roasting and by means of the roaster gases formed therefrom in the strongly exothermic reaction, the steps which comprise roasting the layer at a temperature sufficiently high to cause rapid roasting in the layer to such an extent that the layer consists predominantly of substantially roasted particles, and maintaining the temperature in the layer below the softening point of the substantially roasted material by withdrawing radiant and convective heat from the layer by heat-exchange members located above the layer for withdrawal of radiant heat and by heat-exchange members located in the layer for withdrawal of convective heat and only in the zone of the layer in the upper two-thirds thereof formed by the transition from the quiescent state to the fluidized state and the concomitant increase in volume.

5. A process for the production of gases containing sulfur dioxide which comprises roasting sulfide-containing iron ore in a single continuous layer of roasted material, supplying an oxygen-containing gas to said layer for roasting, maintaining the layer in a fluidized bed by the oxygen-containing gas and by the roaster gases formed in the strongly exothermic reaction, continuously supplying fresh ore to said layer and withdrawing substantially completely roasted material therefrom, roasting the layer at a temperature sufficiently high to cause rapid roasting in the layer to such an extent that the layer consists predominantly of substantially roasted particles, and maintaining the temperature in the layer below the softening point of the substantially roasted material by withdrawing radiant and convective heat from the layer by heat-exchange members located above the layer for withdrawal of radiant heat and by heat-exchange members located in the layer for withdrawal of convective heat and only in the zone of the layer in the upper two-thirds thereof formed by the transition from the quiescent state to the fluidized state and the concomitant increase in volume.

References Cited in the file of this patent

UNITED STATES PATENTS

| Number | Name | Date |
|---|---|---|
| 846,498 | Munson | Mar. 12, 1907 |
| 924,005 | Schweiger | June 8, 1909 |
| 1,134,846 | Hall | Apr. 6, 1915 |
| 1,828,293 | Powell | Oct. 20, 1931 |
| 1,893,913 | Saint-Jacques | Jan. 10, 1933 |
| 1,894,768 | Hechenbleikner | Jan. 17, 1933 |
| 2,019,245 | Berry | Oct. 29, 1935 |
| 2,047,995 | Cordy et al. | July 21, 1936 |
| 2,078,948 | Houdry | May 4, 1937 |
| 2,078,949 | Houdry | May 4, 1937 |
| 2,163,599 | Houdry | June 27, 1939 |
| 2,222,004 | Smith | Nov. 19, 1940 |
| 2,361,623 | Guyer et al. | Oct. 31, 1944 |
| 2,404,944 | Brassert | July 30, 1946 |
| 2,503,555 | Lykken | Apr. 11, 1950 |
| 2,530,077 | Ramsing | Nov. 14, 1950 |
| 2,536,099 | Schleicher | Jan. 2, 1951 |
| 2,637,629 | Lewis | May 5, 1953 |

OTHER REFERENCES

N. K. Adam: "Physics and Chemistry of Surfaces," page 1, page 387, page 377; Oxford University Press, London, 1941.

Perry: Chemical Engineer's Handbook, McGraw-Hill Book Co., 1942, page 2106.

Leighou: Chemistry of Engineering Materials, McGraw-Hill Book Co., N. Y., 1941, pages 455–456.